United States Patent Office 3,808,182
Patented Apr. 30, 1974

3,808,182
2,2-DINITROALKYL VINYL ETHERS AND
POLYMERS THEREOF
Horst G. Adolph, Beltsville, Md., assignor to the United
States of America as represented by the Secretary of
the Navy
No Drawing. Filed June 16, 1972, Ser. No. 266,522
Int. Cl. C08f 3/34; C07c 43/16
U.S. Cl. 260—91.1 R                    10 Claims

ABSTRACT OF THE DISCLOSURE

Monomers of the formula

wherein X is F, Cl, Br or lower alkyl of 1 to 6 carbon atoms, are prepared by contacting vinyl acetate with the corresponding 2,2-dinitroalkanol in the presence of $HgSO_4$ at a temperature between $-5°$ C. and $+5°$ C.

BACKGROUND OF THE INVENTION

This invention generally relates to organic chemicals and, more particularly, to dinitro-containing monomers which can be used to form polymers.

Plastic-bonded explosive and propellant compositions are well-known in the prior art. Currently, materials such as nitropolyesters and poly(2,2-dinitroalkyl acrylates) are used in these compositions. However, these materials are not as highly energetic or as thermally stable as is often desired, so that research has been conducted in an attempt to find materials which are superior to those presently in use.

SUMMARY OF THE INVENTION

Accordingly, one object of this invention is to provide highly energetic organic monomers.

Another object of this invention is to provide a method of preparing said highly energetic organic monomers.

Still another object of this invention is to provide highly energetic organic polymers prepared from the highly energetic organic monomers.

A still further object of this invention is to provide highly energetic organic polymers which have relatively good thermal stability.

Yet another object of this invention is to provide highly energetic organic polymers which can be used as ingredients in plastic-bonded explosive and propellant compositions.

These and other objects of this invention are accomplished by providing monomers of the formula $$X—C(NO_2)_2CH_2O—CH=CH_2,$$

wherein X is F, Cl, Br or lower alkyl of 1 to 6 carbon atoms, which can be polymerized to form polymers useful in plastic-bonded explosive and propellant compositions, and which are prepared by contacting vinyl acetate and the corresponding dinitroalkanol in the presence of $HgSO_4$ at a temperature between $-5°$ C. and $+5°$ C.

DESCRIPTION OF THE PREFERRED EMBODIMENT

The monomers of this invention are represented by the formula $X—C(NO_2)_2CH_2O—CH=CH_2$, wherein X is F, Cl, Br or lower alkyl of 1 to 6 carbon atoms.

These 2,2-dinitroalkyl vinyl ethers are prepared by contacting vinyl acetate with the corresponding 2,2-dinitroalkanol in the presence of $HgSO_4$ as catalyst at a temperature between $-5°$ C. and $+5°$ C. It has been found that the temperature is a very critical factor in this reaction. Alderman, at Journal of the American Chemical Society 75, 2678 (1953), discloses a method for the preparation of simple alkyl vinyl ethers comprising contacting vinyl acetate and the desired alkanol in the presence of $HgSO_4$ as catalyst at a temperature of $-20°$ C. This reaction may be depicted as follows:

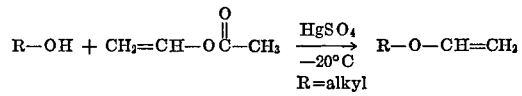
R=alkyl

However, when the same reaction was tried when R was a 2,2-dinitroalkyl radical, the acetates were almost exclusively formed rather than the desired ethers. This reaction may be depicted as follows:

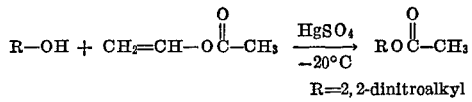
R=2,2-dinitroalkyl

Thus, the Alderman method was found to be unable to produce the desired compounds. However, instantly it has been discovered that, if the temperature of the reaction of vinyl acetate and the 2,2-dinitroalkanol were raised to $-5°$ C. to $+5°$ C., the desired ether would be obtained. It would thus appear that the temperature at which the reaction is carried out is critical to the success of the reaction when the alkanol used is a 2,2-dinitroalkanol.

Polymerization of 2,2-dinitroalkyl vinyl ethers of this invention can be effected with cationic initiators such as boron trifluoride and its complexes, stannic chloride, ferric chloride, etc.; and when X is F, Cl, or Br, radical initiators such as azobis (isobutyronitrile) and peroxides are also effective. Using these catalysts, polymers with molecular weights ranging from 700–10,000 can be prepared.

The general nature of the invention having been set forth, the following examples are presented as specific illustrations thereof. It will be understood that the invention is not limited to these specific examples, but is susceptible to various modifications that will be recognized by one of ordinary skill in the art.

Example I.—2,2-dinitropropyl vinyl ether

A solution of 400 g. of 2,2-dinitropropanol-1 in 640 g. of inhibited vinylacetate was cooled to 0° C. 5 g. of mercuric acetate was added to the well-stirred mixture followed by 0.4 ml. of concentrated sulfuric acid. The mixture was stirred for 16 hours at 0° C., washed with two 100 ml. portions of 2.5% aqueous sodium hydroxide and with 500 ml. of water. The organic layer was then dried over magnesium sulfate. Excess vinyl acetate was removed under reduced pressure (100 mm. Hg, bath temperature 60° C.) and the crude vinyl ether was distilled from the residual oil at 0.2 mm. Hg up to a bath temperature of 100° C. The distillate was again washed with two 250 ml. portions of 0.1 N NaOH and with water. The organic layer was then dried over magnesium sulfate and fractionated to give 281 g. (60%) 2,2-dinitropropyl vinyl ether, B.P. 45.5–47.5° C. at 0.05 mm. Hg. An NMR spectrum confirmed the structure.

Example II.—2,2,2-fluorodinitroethyl vinyl ether

A solution of 45g. of 2,2,2-fluorodinitroethanol in 80 g. of inhibited vinyl acetate is cooled to 0° C. and 0.6 g. of mercuric acetate is added to the well-stirred mixture. Then 0.045 ml. of concentrated sulfuric acid is added. The mixture is stirred for 16 hours at 0° C., washed with two 100 ml. portions of 0.2 N NaOH, dried with magnesium sulfate, and the excess vinyl acetate is distilled off under reduced pressure. The residual oil is washed with 100 ml. 0.1 N NaOH, dried with magnesium sulfate and fractionated at about 10 mm. Hg. Fractions boiling between 66 and 83° C. were collected and refractionated to give 26.8 g. (51%) of 2,2,2-fluorodinitroethyl vinyl ether, B.P. 61–62° C. at 13 mm. Hg. An NMR spectrum confirmed the structure.

Example III.—Polymerization of 2,2-dinitropropyl vinyl ether

A solution of 10 g. of 2,2-dinitropropyl vinyl ether in 15 ml. of 1,2-dichloroethane is placed in a 3-neck flask fitted with an efficient stirrer, a gas inlet for nitrogen sweep, and an exit protected from moisture by a drying tube filled with Drierite. The solution is cooled to 0° C. with an ice bath and a slow stream of nitrogen is passed through the flask. Twenty pellets of molecular sieves, type 5A, are crushed and added to the well-stirred solution. After 15 minutes, 0.15 ml. of stannic chloride is added and the mixture is stirred for 30 hours at about 0° C. The mixture is diluted with 25 ml. of 1,2-dichloroethane, filtered and triturated thoroughly for 1.5 hours with 50 ml. dilute (about 10%) sulfuric acid. The phases are separated, the organic phase is washed with water, two portions of 0.1 N NaOH, again with water and then dried over magnesium sulfate. Removal of the solvent gave the polymer as a light, off-white powder. Molecular weight was 4,000.

Example IV.—Polymerization of 2,2,2-fluorodinitroethyl vinyl ether

A solution of 0.125 g. azobis (isobutyronitrile) in 5 g. 2,2,2-fluorodinitroethyl vinyl ether was placed in a flask purged with nitrogen and heated to 85° C. for 24 hours. After removing unreacted monomer under vacuum, 4 g. of polymer was obtained as a viscous brown oil. The molecular weight of the polymer was 1,500.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. Compounds of the formula $$X—C(NO_2)_2—CH_2—O—CH=CH_2,$$

wherein X is selected from the group consisting of F, Cl, Br and lower alkyl of 1 to 6 carbon atoms.

2. The compound of claim 1 wherein X is F.
3. The compound of claim 1 wherein X is lower alkyl of 1–6 carbon atoms.
4. The compounds of claim 3 wherein X is $CH_3$.
5. A method of preparing the compounds of claim 1 comprising contacting vinyl acetate with an alkanol of the formula $X—C(NO_2)_2—CH_2OH$ at a temperature between −5° C. to +5° C. in the presence of $HgSO_4$ as catalyst.
6. The method of claim 5 wherein the reaction temperature is about 0° C.
7. A homopolymer of the monomer $$X—C(NO_2)_2—CH_2—O—CH=CH_2,$$

wherein X is selected from the group consisting of F, Cl, Br and lower alkyl of 1 to 6 carbon atoms.

8. The homopolymer of claim 7 with a molecular weight between 700 and 10,000.
9. The homopolymer of claim 7 wherein X is F.
10. The homopolymer of claim 7 wherein X is $CH_3$.

References Cited

UNITED STATES PATENTS

| | | | |
|---|---|---|---|
| 3,193,541 | 7/1965 | Ketley | 260—91.1 M |
| 3,287,418 | 11/1966 | Hauptschein et al. | 149—88 X |
| 3,399,240 | 8/1968 | Frankel | 149—88 X |
| 3,531,534 | 9/1970 | Adolph | 149—88 X |

LELAND A. SEBASTIAN, Primary Examiner

U.S. Cl. X.R.

149—88; 260—614 A, 614 F